(12) United States Patent
Zeh et al.

(10) Patent No.: US 12,170,735 B2
(45) Date of Patent: Dec. 17, 2024

(54) CHIP DEVICE AND METHOD FOR A RANDOMIZED LOGIC ENCRYPTION

(71) Applicant: Hensoldt Sensors GmBH, Taufkirchen (DE)

(72) Inventors: Alexander Zeh, Munich (DE); Rolf Baltes, Munich (DE); Andreas Salomon, Munich (DE)

(73) Assignee: Hensoldt Sensors GmBH, Taufkirchen (DE)

( * ) Notice: Subject to any disclaimer, the term of this patent is extended or adjusted under 35 U.S.C. 154(b) by 246 days.

(21) Appl. No.: 17/675,480

(22) Filed: Feb. 18, 2022

(65) Prior Publication Data
US 2022/0271953 A1 Aug. 25, 2022

(30) Foreign Application Priority Data
Feb. 22, 2021 (EP) ..................... 21158414

(51) Int. Cl.
*H04L 9/32* (2006.01)
*B33Y 80/00* (2015.01)
*H04L 9/08* (2006.01)
*B28B 1/00* (2006.01)
*B33Y 10/00* (2015.01)

(52) U.S. Cl.
CPC ............ *H04L 9/3278* (2013.01); *B33Y 80/00* (2014.12); *H04L 9/0894* (2013.01); *B28B 1/001* (2013.01); *B33Y 10/00* (2014.12); *H04L 2209/08* (2013.01); *H04L 2209/12* (2013.01)

(58) Field of Classification Search
CPC ............................ H04L 9/3278; H04L 9/0894
See application file for complete search history.

(56) References Cited

U.S. PATENT DOCUMENTS

| 9,444,618 | B1* | 9/2016 | Trimberger | ........... H04L 9/3278 |
| 10,256,983 | B1* | 4/2019 | Bauer | ................... H04L 9/0861 |
| 11,411,749 | B2* | 8/2022 | Schat | ................... H03K 19/003 |
| 2003/0204743 | A1* | 10/2003 | Devadas | ................ G06F 21/72 |
| | | | | 257/E23.179 |
| 2008/0279373 | A1* | 11/2008 | Erhart | ................... H04L 9/3249 |
| | | | | 714/E11.017 |

(Continued)

OTHER PUBLICATIONS

Extended European Search Report issued in European Application No. 21158414.9 dated Jul. 20, 2021 (seven (7) pages).

*Primary Examiner* — Khang Do
(74) *Attorney, Agent, or Firm* — Crowell & Moring LLP (57) ABSTRACT

A chip device with a logic circuitry (105) protected by a randomized logic encryption based on a key (K) for preventing a designated usage of the logic circuitry (105) by an unauthorized user comprises: a physically unclonable function, PUF, (110), a storage (120), and a chip enabler (130) with one or more registers (132). The physically unclonable function, PUF, (110) is configured to generate a device-individual response (Re) based on a challenge (Ch). The storage (120) has stored the challenge (Ch) and a data element (C), the data element (C) being an encryption of the key (K) with the response (Re) of the PUF (110) as encryption key. The enabler (130) is configured to enable the logic circuitry (105) for the designated usage only, when the key (K) is transferred to the register(s) (132), the key (K) being a decryption of the data element (C) with the response (Re) as the encryption key.

11 Claims, 5 Drawing Sheets

(56) References Cited

U.S. PATENT DOCUMENTS

| | | | | |
|---|---|---|---|---|
| 2009/0080659 A1* | 3/2009 | Elder | | H04L 9/0877 380/278 |
| 2010/0176920 A1* | 7/2010 | Kursawe | | G06F 21/86 340/5.74 |
| 2012/0066571 A1* | 3/2012 | Marinet | | G11C 7/24 714/E11.055 |
| 2013/0142329 A1* | 6/2013 | Bell | | H04L 9/0866 380/44 |
| 2013/0156183 A1* | 6/2013 | Komano | | H04L 9/0861 380/44 |
| 2014/0032933 A1* | 1/2014 | Smith | | G06F 21/31 713/193 |
| 2015/0026545 A1* | 1/2015 | Yu | | H03M 13/134 714/780 |
| 2016/0078252 A1 | 3/2016 | Chandra et al. | | |
| 2016/0099714 A1* | 4/2016 | Muchsel | | H04L 9/0866 380/277 |
| 2016/0342777 A1* | 11/2016 | Sadhasivan | | G06F 21/14 |
| 2016/0364582 A1* | 12/2016 | Cammarota | | H04L 9/008 |
| 2017/0257222 A1* | 9/2017 | Pedersen | | G06F 1/26 |
| 2017/0288869 A1 | 10/2017 | Li et al. | | |
| 2018/0006830 A1* | 1/2018 | Cambou | | G06F 21/44 |
| 2018/0176012 A1* | 6/2018 | Hung | | G11C 7/24 |
| 2018/0183614 A1* | 6/2018 | Danger | | H04L 9/0866 |
| 2019/0036713 A1* | 1/2019 | Slik | | H04L 9/3278 |
| 2019/0165935 A1* | 5/2019 | Tehranipoor | | H04L 9/14 |
| 2019/0334730 A1* | 10/2019 | Endress | | H04L 9/3278 |
| 2020/0037451 A1* | 1/2020 | Elimelech | | H05K 1/095 |
| 2020/0298468 A1* | 9/2020 | Drummond | | B29C 31/04 |
| 2021/0135886 A1* | 5/2021 | Lee | | H04L 9/0866 |
| 2021/0194707 A1* | 6/2021 | Aronson | | H04L 9/0861 |
| 2021/0234678 A1* | 7/2021 | Armleder | | H04L 9/0822 |
| 2021/0234709 A1* | 7/2021 | Kim | | G06F 21/44 |
| 2021/0243021 A1* | 8/2021 | Fourquin | | H04L 9/0866 |
| 2021/0250189 A1* | 8/2021 | Ahn | | H04L 9/3278 |
| 2021/0281431 A1* | 9/2021 | Swaminathan | | G06F 21/73 |
| 2021/0377057 A1* | 12/2021 | Poeppelmann | | H04L 9/3273 |
| 2021/0398909 A1* | 12/2021 | Dogiamis | | H01L 23/49838 |
| 2022/0187802 A1* | 6/2022 | Wittenberg | | H04L 9/3239 |
| 2022/0209966 A1* | 6/2022 | Chhabra | | H04L 9/0866 |
| 2022/0209969 A1* | 6/2022 | Chhabra | | H04L 9/0866 |
| 2022/0234378 A1* | 7/2022 | Jackson | | B42D 25/405 |
| 2022/0239506 A1* | 7/2022 | Palmer | | H04L 9/3278 |

\* cited by examiner

CHIP DEVICE AND METHOD FOR A RANDOMIZED LOGIC ENCRYPTION

FIELD

The present invention relates to a chip device and a method for protecting a circuit by a randomized logic encryption and, in particular to a logic encryption hardened by additive manufacturing.

BACKGROUND

It is widespread in chip manufacturing that the manufacturing process takes place in a foundry by a third party with only limited control over the manufacturing process. As a consequence, there are several attack scenarios where a potential attacker can get knowledge of hardware intellectual property (IP) that for security reasons shall be kept confidential.

For example, the following attack scenarios are conceivable:

Attack scenario 1 (AS-1): This scenario relies on reverse engineering and insertion of hardware trojans. Here, the attacker identifies in the foundry the device technology and is able to extract its gate-level netlist or may otherwise infer its functionality. With this knowledge the attacker could build additional chips.

Attack scenario 2 (AS-2): This scenario relates to a so-called IP overproduction or overbuilding, i.e. the attacker produces additional chips.

Attack scenario 3 (AS-3): This scenario relates to hardware attacks on countermeasures against the previously mentioned attack scenarios. Here, the hardware attacks are, for example, so-called fault injections to overcome the countermeasure against the attack scenario 1 and the attack scenario 2. For example, the attack in this scenario may be directed to a read/write protection of a protected storage area (for example an embedded flash storage).

For all attack scenarios one can distinguish the cases: (a) the system-on-chip (SoC) is produced the first time in the foundry yielding the attack scenarios AS-1a, AS-2a, AS-3a, and (b) the chip is produced subsequent times in the foundry yielding the attack scenarios AS-1b, AS-2b, AS-3b.

So far, there are only limited countermeasures available to prevent all three attack scenarios reliably. However, since all attack scenarios are not acceptable, the attacker should at least not be able to activate the produced chips or to overbuild them.

Therefore, there is a demand for chip devices and respective methods that reliably protect the hardware intellectual property.

SUMMARY OF THE INVENTION

At least some of the above-mentioned problems are solved by a chip device and by a method for protecting a circuit by a randomized logic encryption according to the independent claims. The dependent claims refer to specifically advantageous realizations of the subject matter of the independent claims.

The present invention relates to a chip device with a logic circuitry protected by a randomized logic encryption based on a key (e.g. a secret key) for preventing a designated usage of the logic circuitry by an unauthorized user. The chip device comprises a physically unclonable function (PUF), a storage, and a chip enabler with one or more registers. The physically unclonable function is configured to generate a device-individual response based on a challenge. The storage has stored the challenge and a data element, wherein the data element is an encryption of the key (logic encryption key) with the response of the PUF as encryption key. The chip enabler is configured to enable the logic circuitry for the designated usage, only when the key is transferred to the register(s). The key is, for example, a secret key derived by a decryption of the data element, where the response of the PUF is the decryption key.

Optionally, the chip enabler includes a cryptographic module and/or a processing unit to perform the decryption of the data element to generate the key. According to further embodiments the processing of the data, such as encryption and decryption, may be performed by an external unit. Moreover, the cryptographic module may be a dedicated cryptographic hardware chip being part of the device or not.

Optionally, the logic circuitry comprises regular (logic) gates and a plurality of logic key gates defining the logic encryption. The logic encryption may be defined in that the designated usage is enabled only, if bits of the key in the one or more registers are correctly received by the logic key gates. This correctness may be ensured by connecting the register(s) to the corresponding logic key gates so that the enabling key bits will automatically enable the logic circuitry for the designated purpose.

Optionally, the device comprises an additively manufactured component and the PUF is included in at least a part of the component. The additively manufactured component has a device-specific microstructure resulting in a device-specific characteristic. The response of the PUF depends thus on the device-specific characteristic. The device-specific microstructure is a consequence of the additive manufacturing producing a random microscopic structure, e.g. by merging or fusing of nanoparticles (e.g. of electrically conductive additive material or dispersed in functional fluids). This random structure gives the PUF its individual characteristics that differs from device to device, i.e. the device-specific characteristic).

Optionally, the additively manufactured component is at least one of the following: a packaging, a circuit board, a soldering layer, an encapsulation. For example, the logic circuitry may be formed as or in an integrated chip, which is encapsulated, supported or packed in the additively manufactured component accommodating the PUF.

Optionally, the component includes an additive manufactured electric circuitry with at least one of the following additively manufactured elements: a capacitor, a coil, a resistor, a stripline, a microstrip or other elements. The electric characteristic of each of these elements is device-specific due to the additive manufacturing process.

Optionally, the device-specific characteristic is defined by one or more of the following:
- a form factor of electric conductive elements (e.g. their size, shape, ratios of dimensions etc.),
- a movement,
- resistive values (e.g. DC resistance),
- latency or phase shifts,
- complex impedance values (e.g. resistance, capacitance and inductance),
- a resonance circuit or its resonance frequency,
- electromagnetic radiation or shielding thereof.

It is apparent that, when comparing additively manufactured elements with conventionally manufactured elements, the random microstructures produce effective characteristics which will randomly (slightly) differ. Therefore, also geometric characteristics such as the form factor will effectively differ. Same holds for signal propagations, e.g. along striplines (resulting in random latencies), or for a 3D printed electric motor or engine, which will have an individual characteristic (speed, force etc. as function of an applied voltage).

According to embodiments, a resonant circuit may be used for measuring the complex impedance which is encoded in the additively manufactured circuitry. The resonance frequency is a highly sensitive quantity that can be used to define a device-specific characteristic usable as PUF.

Optionally, the device-specific characteristic is defined by one or more of the following optical identifications:
unique label inprint,
intended error pixel,
inprinted optical light source.

These embodiments may, for example, use a chip interposer arranged between the chip and the board or a combination of two additively manufactured structures, wherein at least one of them supports the chip. An error pixel can be implemented by an embedded structure made of the conductive fluid in the dielectric component. For example, a silver particle of the conductive fluid representing one or more pixels in the captured image may be intentionally additively manufactured in polymer surface of the dielectric component. Upon visual inspection this may look like any other random impurity or microscopic contamination in the dielectric support structure, which may be present in any realistic additively manufactured component. Then, on one structure (e.g. the one with the chip) a camera may be placed that captures one or more images after attaching the interposer to the board. According to embodiments, the chip evaluates whether the defective pixel(s) (e.g. the exemplary silver particle) in the polymer surface is/are at the correct predetermined position where it is was intentionally formed.

According to further embodiments, the label inprint may be a QR-code which is formed on two layers of the interposer on the board. Both layers are arranged on top of each other so that a predetermined QR-code will appear as superposition of both parts of the QR-code that are formed on the separate layers. Since the printed board exhibit some transparency, the superposition appears as the predetermined QR-code. Slight deviations in one of the QR-code parts will result in a wrong code. The correctness of the code can be examined again by a camera as for the intended error pixel. Again, if the image evaluation confirms the correctness, the chip can be enabled. Of course, there may be more the two QR-code parts allowing a plurality of valid QR-codes by selecting two of the possible QR-code parts. Similarly, more than two parts may be combined, which would further increase the complexity of the coding.

Embodiments using an inprinted light source rely on the same principle. The light source will produce a specific electro-magnetic spectrum which can be captured by the camera and evaluated by a processing device. Again, the chip can be enabled when the correct light source is combined with the correct chip.

Since a potential attacker does not know the coding (error pixel, QR codes, or the light source) in advance, also this PUF provides a high security.

Optionally, the device further comprises at least one finite state machine configured to utilize the PUF to generate the response from the challenge, and/or to decrypt the data element using the response as key for the decryption.

Optionally, the additive manufacturing includes an inkjet process or a laser sinter process, configured to selectively form a three-dimensional (3D) device with dielectric structures and electrically conductive structures. The inkjet process is based on different functional fluids for electrically conductive elements and for dielectric materials and involves a curing step, e.g. after each printed layer. The conductive fluid includes, e.g. nanoparticles that merge or fuse together in the process of curing (e.g. using an energy irradiation).

Further embodiments relate to a method for protecting a logic circuitry by a randomized logic encryption based on a key for preventing a designated usage of the logic circuitry by an unauthorized user. The method comprises:
generating, by using a physically unclonable function (PUF) a device-individual response based on a challenge;
storing, in a storage, the challenge and a data element, the data element being an encryption of the key with the response of the PUF as encryption key; and
enabling, by a chip enabler with one or more registers, the logic circuitry for the designated usage by transferring the key into the register(s), the key being a decryption of the data element with the response as the encryption key.

Optionally, the method further comprises one or more of the following steps:
generating the response of the PUF based on the challenge;
encrypting the key with the response of the PUF as encryption key and providing a result as the data element;
decrypting the data element be using the response of the PUF as decryption key.

It is understood that the data processing such as encryption and decryption may be performed by a (processing) unit such as a dedicated cryptographic hardware chip, which may or may not be external to the device.

Likewise, according to further embodiments, all functions described before in conjunction with the chip device may be implemented as optional method steps. The order of method steps shall only be limited in that one method step is needed in advance to carry out another step.

This method may also be implemented in software or a computer program product. Thus, embodiments relate also to a computer program product having a program code stored thereon, which performs the above-mentioned method, when the program code is executed on a computer or processor.

BRIEF DESCRIPTION OF DRAWINGS

Various embodiments of the present invention will be described in the following by way of examples only, and with respect to the accompanying drawings, in which.

DETAILED DESCRIPTION

Various examples will now be described more fully with reference to the accompanying drawings in which some examples are illustrated.

The terminology used herein is for the purpose of describing illustrative examples only and is not intended to be limiting. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements and/or components, but do not preclude the presence or addition of one or more other features, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
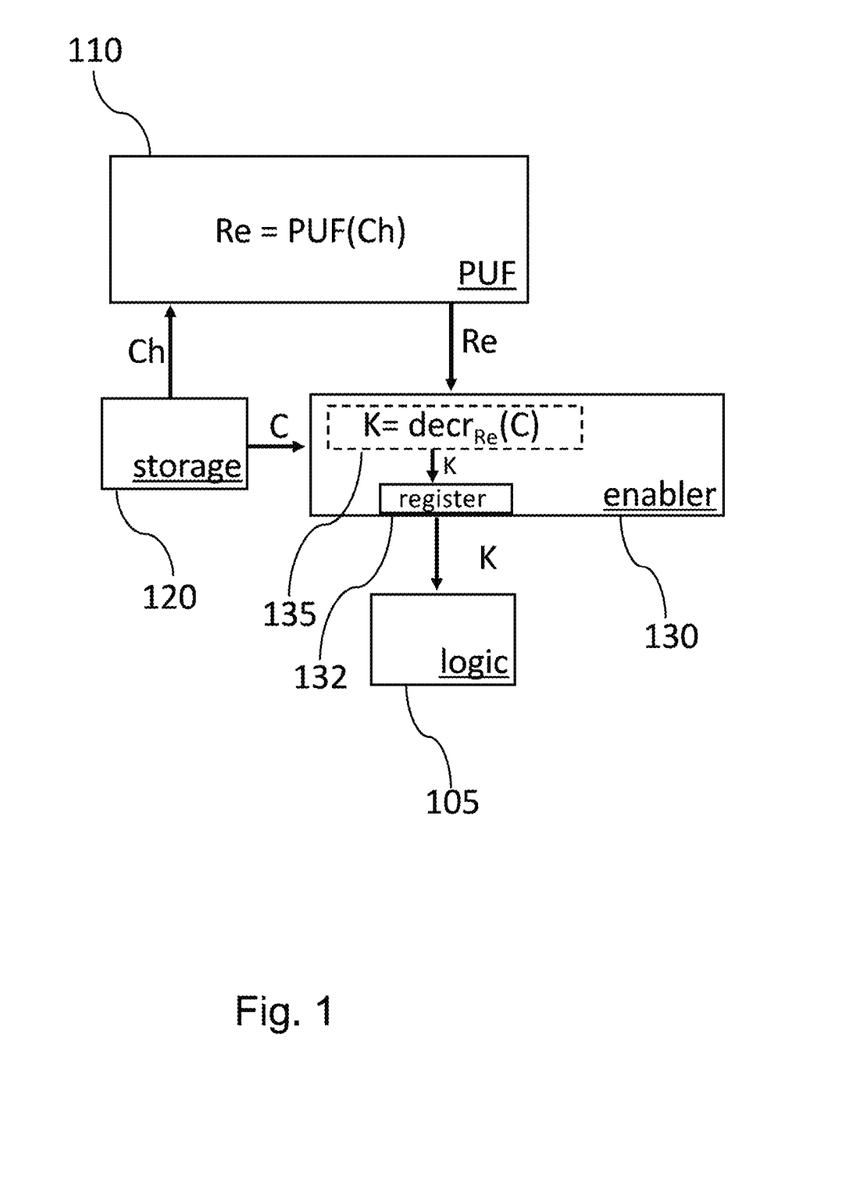
FIG. 1 depicts a chip device according to an embodiment of the present invention.

FIG. 1 depicts an exemplary SoC device with a logic circuitry 105 that, according to embodiments, is protected by a randomized logic encryption based on a key K for preventing a designated usage of the logic circuitry 105 by an unauthorized user. In other words, the logic circuitry 105 is enabled only if the correct key K is received by the logic circuitry 105.

The SoC device comprises: a physically unclonable function, PUF, 110, a storage 120, and a chip enabler 130 with one or more registers 132. The physically unclonable function, PUF, 110 is configured to generate a device-individual response Re based on a challenge Ch. The storage 120 has stored the challenge Ch and a data element C, the data element C being an encryption of the key K (e.g. a logic locking key) with the response Re of the PUF 110 as encryption key. The enabler 130 is configured to enable the logic circuitry 105 for the designated usage only, when the key K is transferred to the register(s) 132, the key K being a decryption of the data element C with the response Re as the encryption key. Embodiments are applicable for any kind of chip devices. In particular, the chip device may be SoC (System on Chip) device or part thereof.

Figure 2:
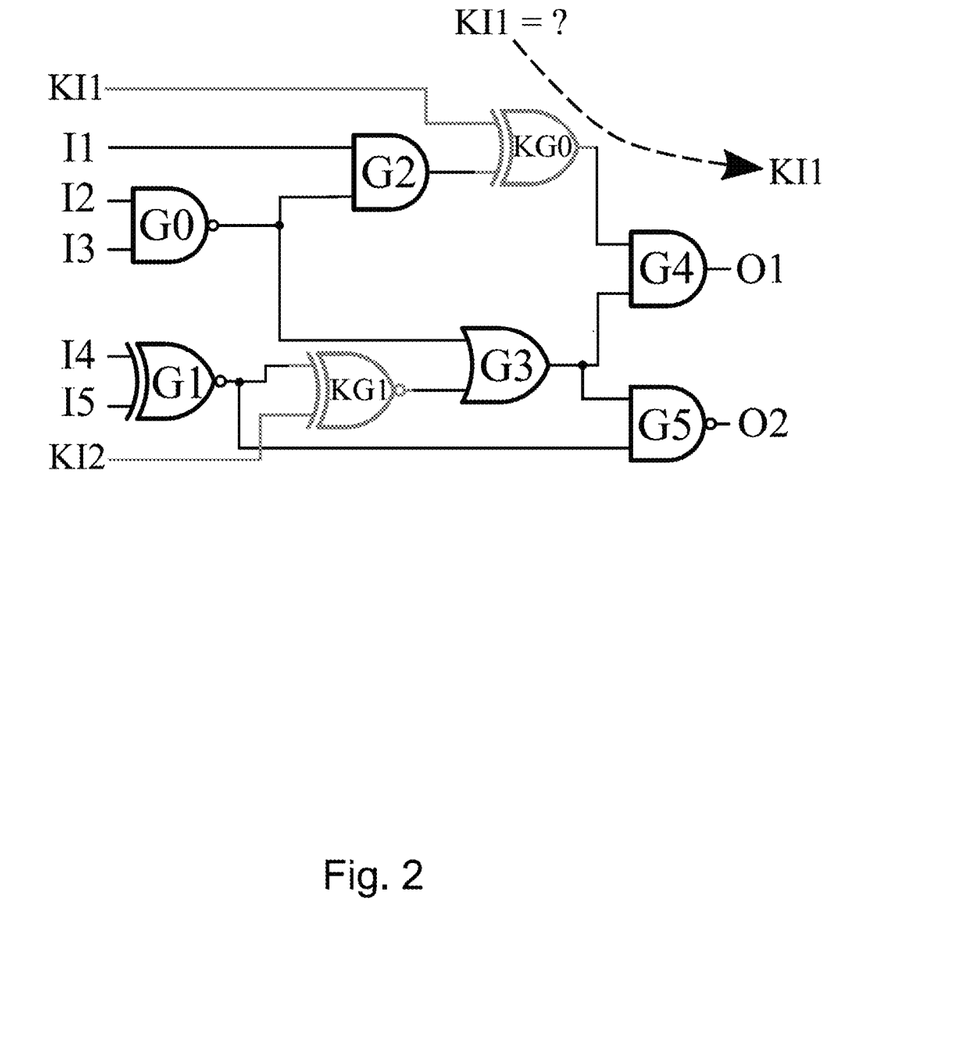
FIG. 2 illustrates the logic encryption implemented by embodiments in the chip device.

The underlying logic encryption scheme utilized in embodiments can be summarized as illustrated in FIG. 2. The purpose of the Logic Encryption (LE) (logic locking/obfuscation) is to protect the integrity of a hardware design throughout the IC supply chain. LE is based on the insertion of additional gates into a gate-level netlist (NL) to mask the original functionality and structure of a design, by locking it with a secret key K.

In detail, FIG. 2 depicts an example where additional key gates KG0, KG1 are inserted in a design with regular (logic) gates G0, G1, G2, . . . G5. It is understood that the number of regular and key gates can be arbitrary. The regular gates G0, G1, . . . are adapted to provide the designated purpose of the underlying chip, i.e. generating desired output signals O1, O2 based on a set of input signals (values) I1, I2, . . . .

For example, a zeroth regular gate G0 receives two input values I2 and I3 and produces an output value which is received by a second gate G2 and by a third gate G3. The second gate G2 receives as further input the input signal I1. The third logic gate G3 receives as further input the output of a first logic gate KG1 which receives as input values a second key value KI2 and the output value of a first logic gate G1. The first logic gate G1 receives as input a fourth input signal 14 and a fifth input signal I5. The output of the second logic gate G2 is input into a zeroth key gate KG0 which receives as further input the first key value KI1. The output of the zeroth key gate KG0 is, together with output of the third logic gate G3, received by the fourth gate G4 which produces the first output value O1. The output of the third logic gate G3 is received by the fifth gate G5 which receives as second input the output of the first logic gate G1. The output of the fifth gate is the second output value O2.

Therefore, even if the gates are all known (e.g. by a reverse engineering) the correct (designated) functioning of the circuitry is obfuscated by the key gates KG0, KG1. Without the correct key values KI1, KI2 the circuitry would not work correctly. In other words, the chip can only be activated with the correct key values KI1, KI2, . . . stored at a designated place and provided correctly to the chip. The plurality of key values KI1, KI2, . . . define the logic encryption key (LEK) which will be denoted here and in the following by K.

This key K should by stored at a secure place. At startup, the key K may be read from the storage (e.g. via a finite state machine, FSM) and transferred, e.g. into dedicated registers, which are connected to the key gates KG0, KG1, . . . . Therefore, by protecting the key K the functionality of the device can be kept secret.

This procedure will mitigate at least some of the previously mentioned attack scenarios AS:

As for AS-1a: As long as the key K is kept confidential during production of the chips, hardware trojans (HT) insertion can be prevented by the LE.

As for AS-1b: An attacker may access the key K from a first round of produced chips and then insert the HT when the (n+1)th round is produced.

As for AS-2{a,b}: An attacker may retrieve the K and activate/overbuild a chip.

As for AS-3a: A fault E injected on Slot 1 can propagate and K⊕E may be analyzed, because small variations of two distinct faults Ei and Ej are directly "forwarded".

As for AS-3b: With the learning from AS-3a, the fault attacks may be re-produced for the (n+1)th round SoCs.

Therefore, embodiments implement an additional security measure by using a physical unclonable function (PUF). A PUF is a physical object that for a given input and conditions (denoted by challenge), provides a physically-defined "digital fingerprint" output (response) that serves as a unique identifier. The PUF according to embodiments map unique variations of at least one additively manufactured component (e.g. an electronic structure) of the chip device to a digital output, wherein unique physical variations that occur during an additive manufacturing process are utilized. For this, according to embodiments, the component with the PUF may be integrated at various places, such as: in the packaging or in an encapsulation of the chip or in the circuit board support of the chip or in a solder layer or an interposer connecting the chip.

The additive manufacturing process utilized in embodiments may rely on the technology for "additive manufactured electronics" (AME) of 3D-printed electronics for additive circuit boards (ACB). According to embodiments, various additive manufacturing processes may be utilized such as the inkjet printing or the laser sintering, which both allow for a manufacturing of conductive and dielectric structures to produce, e.g. a desired electronic circuit.

The inkjet printing (so-called inkjet process) may use a conductive and a non-conductive functional fluid (e.g. ink), which are additively applied to a carrier and processed into a three-dimensional structure. For example, a photopolymer fluid may be used as ink for non-conductive structures and a fluid with nanoparticle (e.g. of silver) may be used as ink for conductive structures. Theses fluids are added layer by layer. Each layer may be cured by an irradiation with an ultraviolet light or other suitable radiation. The result is a three-dimensional solid that was additively manufactured in layers.

The laser sintering process may utilize the so-called "low-temperature cofired ceramic" (LTCC) process. This process is based on low-sintering flexible ceramic foils, wherein the foils are first structured mechanically and printed, laminated and then sintered at approx. 850 to 900° C. The result is a highly integrated, three-dimensionally networked multilayer board made of ceramic. Further processing may use known layer, bond or SMD technologies (SMD, surface mounted devices). The carrier material here is ceramic. Its stability enables a high-quality connection and packing system.

In both processes, the electronic structure is build-up from scratch to a complete 3D device. In particular, these additive manufacturing processes allow to integrate or embed a chip (such as SoC) into an additively manufactured packaging, for example. Or the chip may be mounted onto an additively manufactured board or may be encapsulated by an additively manufactured housing.

The conductive/isolating fluids in the ink jet process or the nanoparticle sintering of conductive functional fluids or the various postprocessing variants generate a unique nanoparticle structure in the final chip device. Each chip has a nanoparticle fingerprint and embodiment utilize this fingerprint for incorporating a PUF.

Figure 3:
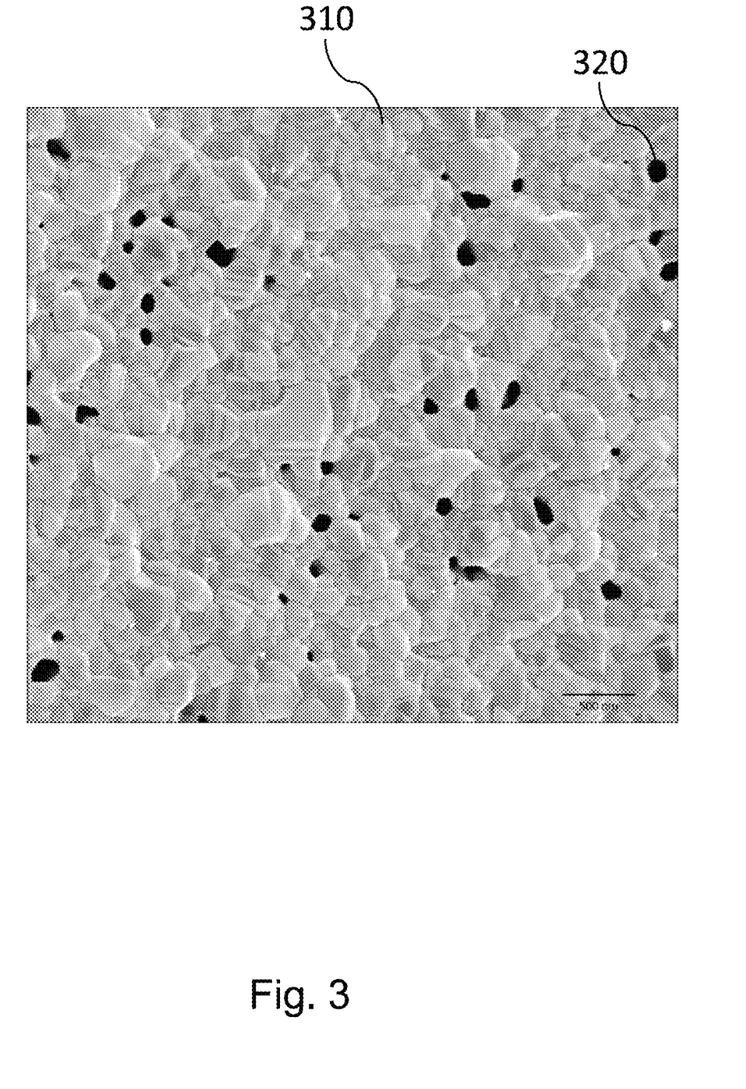
FIG. 3 illustrates the microstructures resulting from an additive manufacturing providing the randomness used in embodiments for the PUF.

FIG. 3 illustrates the microstructures resulting from an additive manufacturing of an exemplary electronic structure that will be utilized for or includes the PUF. The additive manufacturing will always result in a microstructure that is not uniform, but is specific for the manufacturing process and will thus be different from manufactured structure to structure. For example, electrically conductive nanoparticles 310 are merged during the manufacturing leaving random cavities 320 between the merged nanoparticles 310.

Therefore, each additive manufactured conductive structure has its own specific microstructure. As a result, the electric characteristics of the conductive materials will be slightly different from chip to chip (or their additively manufactured component defining the PUF). Furthermore, in the additive manufacturing a full 3D-wiring can be implemented, no vertical interconnect accesses (VIAs) are needed, and thus 3D-printed lumped elements (capacitors, coils) can be generated. It is also possible to integrate or embed other electric components (e.g. active elements). For example, if a coil or a capacitor or a resistor is formed by this additive manufacturing, the resulting characteristics will be structure-specific and can be used as a physical unclonable function.

The physical unclonable function may be characterized by various circuits or structures. For example, the microstructure as depicted in FIG. 3 generates specific complex impedance values and thus specific resistance and/or capacitance and/or inductance values. This in turn, will provide a structure-specific resonance property for a resonant circuit. For example, the resonance frequency will differ from structure to structure. Since the structure is part of the chip device, this will likewise differ from device to device.

Figure 4:
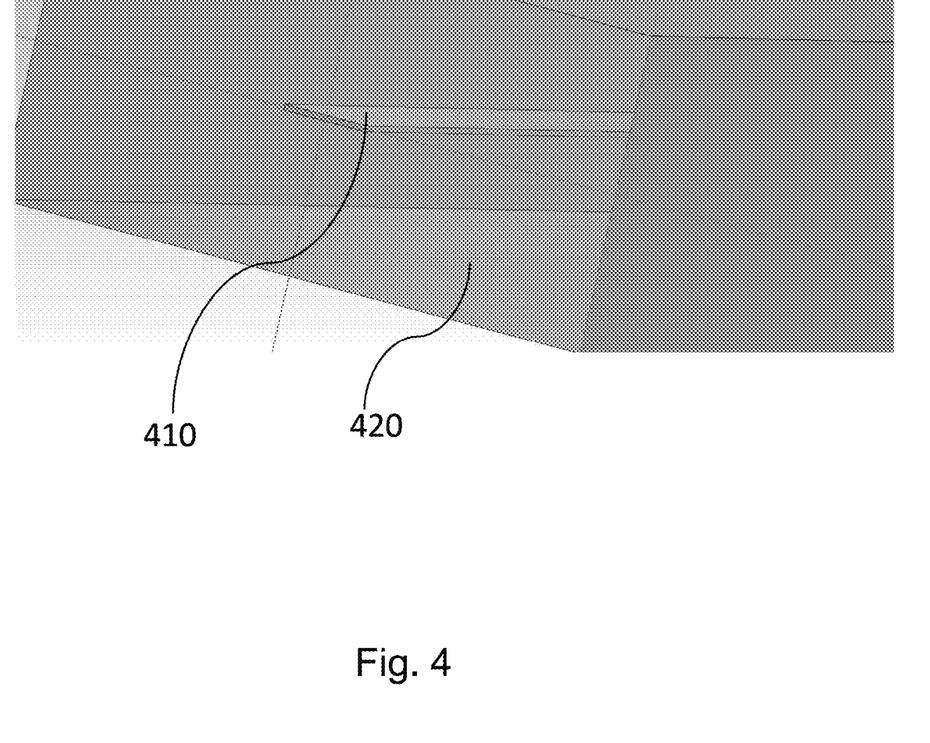
FIG. 4 depicts stripline as an embodiment for the component in the chip device for implementing the PUF.

FIG. 4 depicts another embodiment of a component in the chip device that may be used to integrate the physical unclonable function 110. In this embodiment the additively manufactured component includes a stripline 410 embedded into dielectric material 420. Instead of stripline 410, microstrip configurations can also be used within the PUF 110. The stripline 410 is completely embedded into the dielectric material 420. Since the electric conductive strip 410 as well as the dielectric material 420 are formed by additive manufacturing, the propagation velocity of a high frequency signal along the stripline 410 will depend on the particular structure and thus on the chip device. The structure-specific propagation results in a specific latency (delay) in signal propagation and/or in a specific signal damping through the line.

The nanoparticle fingerprint influences thus the electric properties such as latency and phase shift of propagating signals, which may be measured, e.g. by comparing two signals propagating different paths. Likewise, the nanoparticle fingerprint modifies slightly electromagnetic radiation properties (e.g. shielding).

Likewise, the additive manufacturing produces slight variations in form factors or movements (e.g. characteristics of 3D-printed electric motors).

According to further embodiments, optical variations in optical characteristics may be further utilized for the physical unclonable function. For example, during the additive manufacturing a unique label may be imprinted into the chip device (for example in the packaging) which can be read out and used as an encryption for the logic encryption utilized within the present invention. A further optical identification would be the incorporation of intended error pixels or even an imprinted optical light source.

The concrete functioning of the PUF 110 can be summarized as follows. Let $Ch_i$ be a challenge of the j-th instance of a PUF (family). Each instance may be associated with a concrete realization in one chip device. The response is $$Re_i = PUF_j(Ch_i). \qquad (1)$$

One main characteristic of the PUFs is that the Hamming distance for a challenge $Ch_1$ $$Dist_H(PUF_i(Ch_1), PUF_j(Ch_1)), \qquad (2)$$

for i≠j is very large.

PUFs with small output size and input size W are called weak PUFs. In this case, an untrusted foundry could do a full characterization and could store all pairs $\{(Ch_i, Re_i)\}$, which are part of W for all chip devices, where W denotes the set of all possible values of input/output for weak PUFs. Strong PUFs, on the other hand, have a very large input/output space S, making characterization impractical and thus much more secure, i.e., $\{(Ch_i, Re_i)\}_{i \in S}$, where $|S| \gg |W|$.

According to embodiments, for a chip device "i" the following information is stored in the storage 120:

$ENC_{Rei}$ (K), and (Ch, He)

wherein $Re_i$ is the response of the $PUF_i$ realized in the chip device "i" and is used as encryption key for the LEK "K". The value He defines optional helper data for the key generation (to ensure high entropy, reproducibility, control, etc.). This information may be stored in different slots (e.g. a slot 1 and slot 2) of a storage 120.

Next, when the chip device shall be activated to perform the desired purpose, the following steps may be performed:
(1) Read $C_i \leftarrow ENC_{Rei}$ (K) and (Ch, He) from the storage, e.g. via FSM;
(2) Generate $Rei \leftarrow PUF_i$ (Ch, He), e.g. via FSM;
(3) Decrypt $K \leftarrow DEC_{Rei}$ ($C_i$); e.g. via FSM in a dedicated HW module;
(4) Transfer K into dedicated registers (connected to the inserted gates), wherein an optional finite state machine (FSM) may be employed.

According to embodiments, these steps may be performed as part of a method, wherein $PUF_i$ defines an execution of the implemented physical unclonable function using the challenge Ch. According to further embodiment, a processing unit and/or cryptographic hardware module which may or may not be part of the chip device may be configured to perform these steps.

In conjunction with the above-mentioned attack scenarios, embodiments provide the following advantages:

As for AS-1a: The key K (resp. $ENC_{Rei}$ (K)) is kept confidential during production of the chip device and one can rely on the resistance of the LE to prevent the insertion of hardware trojans.

As for AS-1b: The value $ENC_{Rei}$ (K) and the tuple (Ch,He) may be retrievable. However, the function to generate the corresponding $Re_i$ relies on the protection of the PUF 110, which is unknown or not reproducible. Thus, it is impossible to obtain the encryption key $Re_i$ needed to decrypt K.

As for AS-2{a,b}: An attacker may be replay $ENC_{Rei}$(K) and (Ch,He). But it is impossible to rebuild the PUF function 110, other attacks would be needed.

As for AS-3a: The situation is similar to variant 1, i.e. for two distinct faults $E_i$ and $E_j$ with small Hamming distance distH ($E_i$, $E_j$) injected on slot 1, the Hamming distance:

$$dist_H(DEC_{Rei}(ENC_{Rei}(K))\oplus E_i), DEC_{Rei}(ENC_{Rei}(K)\oplus E_j))$$

is very large. Therefore, fault attacks are very hard to "execute" (e.g. by trying all possibilities).

As for AS-3b: Embodiments improve the safety significantly when compared to the situation where the key K and/or the encryption of the key ENC(K) is the same for all devices. Even if the attacker infers information from an attack on a device A, according to embodiments, this information cannot be utilized for an attack on another device B (because of the PUF). Hence, the learning from AS-3a is smaller (than in Variant 1a), because $ENC_{Rei}$ (K) is unique to each device chip.

As a result, embodiments provide a reliable protection against all three attack scenarios.

Figure 5:
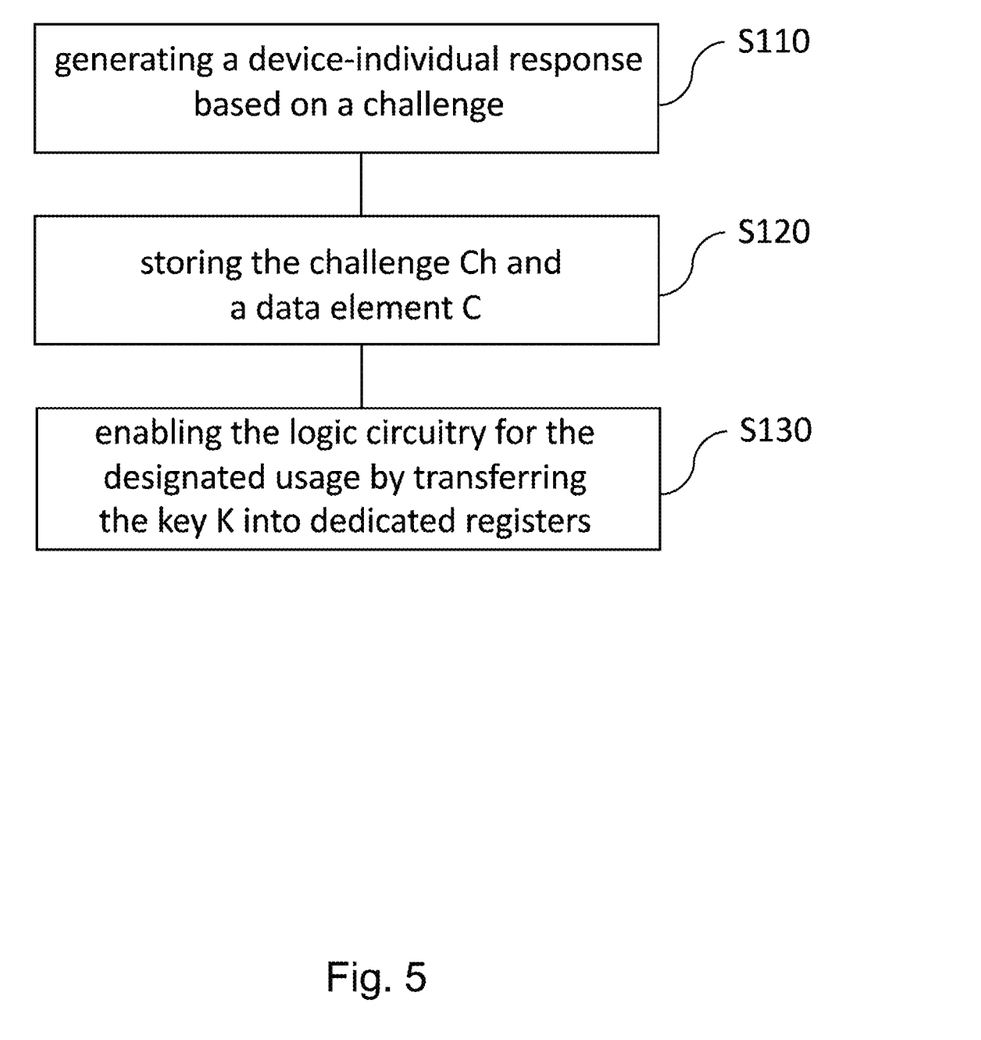
FIG. 5 shows a schematic flow chart for a method for protecting a logic circuitry by a randomized logic encryption.

FIG. 5 shows a schematic flow chart for a method for protecting a logic circuitry 105 by a randomized logic encryption based on a key K for preventing a designated usage of the logic circuitry 105 by an unauthorized user. The method includes:
- generating S110, by using a physically unclonable function, a device-individual response based on a challenge Ch;
- storing S120, in a storage 120, the challenge Ch and a data element C, the data element C being an encryption of the key K with the response Re of the PUF 110 as encryption key;
- enabling S130, by a chip enabler 130 with one or more registers 132, the logic circuitry 105 for the designated usage by transferring the key K into the register(s), the key K being a decryption of the data element C with the response Re as the encryption key.

It is understood that in further embodiments some or all functions implemented by the chip device as described before can be optional method steps in the method of FIG. 5. In particular, further optional steps may be:
- generating the response Re of the PUF 110 based on the challenge Ch; or
- encrypting the key K with the response Re of the PUF 110 as encryption key and providing a result as the data element C; or
- decrypting the data element C be using the response Re of the PUF 110 as decryption key.

The order of method steps shall only be limited by the condition that one method step can only be carried out if another step is performed in advance.

This method may also be a computer-implemented method. A person of skill in the art would readily recognize that steps of the above-described method may be performed by programmed computers. Embodiments are also intended to cover program storage devices, e.g., digital data storage media, which are machine or computer readable and encode machine-executable or computer-executable programs of instructions, wherein the instructions perform some or all of the acts of the above-described methods, when executed on a computer or processor.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 105 a logic circuitry
110 physically unclonable function (PUF)
120 a storage
130 chip enabler
132 one or more registers
135 cryptographic module
310 merged nanoparticles
320 cavities or voids due to additive manufacturing
410 stripline, microstrip
420 additively manufactured dielectric material
K logic encryption key
Re (device-individual) response
Ch challenge to trigger the response
C data element

What is claimed is:
1. A chip device, comprising:
a logic circuitry protected by a randomized logic encryption based on a key for preventing a designated usage of the logic circuitry by an unauthorized user;

a physically unclonable function, PUF, being configured to generate a device-specific response based on a challenge;

a storage having stored the challenge and a data element, the data element being an encryption of the key with the response of the PUF as an encryption key; and a chip enabler with one or more registers, the enabler being configured to enable the logic circuitry for the designated usage only, when the key is transferred to the register(s), the key being a decryption of the data element with the response as the encryption key, wherein the logic circuitry comprises regular gates and a plurality of logic key gates defining the logic encryption, wherein the logic encryption is defined in that the designated usage is enabled only if bits of the key in the register(s) are correctly received by the logic key gates, which are connected to the register(s).

2. The device according to claim 1, wherein the chip enabler includes cryptographic module and/or a processing unit to perform the decryption of the data element to generate the key.

3. The device according to claim 1, wherein the device comprises an additively manufactured component and the PUF is included in at least a part of the component, the additively manufactured component having a device-specific microstructure resulting in a device-specific characteristic, wherein the response of the PUF depends on the device-specific characteristic.

4. The device according to claim 3, wherein the additively manufactured component is at least one of the following:
a packaging,
a circuit board,
a soldering layer,
an encapsulation.

5. The device according to claim 3, wherein the component includes an additive manufactured electric circuitry with at least one of the following additively manufactured elements: a capacitor, a coil, a resistor, a stripline, a microstrip, whose electric characteristics is device-specific due to the additive manufacturing.

6. The device according to claim 3, where the device-specific characteristic is defined by one or more of the following:
a form factor,
a movement,
resistive values,
latency or phase shifts,
complex impedance values,
a resonance circuit or its resonance frequency,
electromagnetic radiation or shielding thereof.

7. The device according to claim 3, where the device-specific characteristic is defined by one or more of the following optical identifications:
unique label inprint,
intended error pixel,
inprinted optical light source.

8. The device according to claim 1, further comprising at least one finite state machine configured:
to utilize the PUF to generate the response from the challenge, and/or
to decrypt the data element using the response as key for the decryption.

9. The device according to claim 3, wherein the additive manufacturing includes an inkjet process or a laser sinter process, configured to form dielectric structures and electrically conductive structures.

10. A method for protecting a logic circuitry, comprising:
providing a randomized logic encryption based on a key to prevent a designated usage of the logic circuitry by an unauthorized user;
generating, by using a physically unclonable function, PUF, a device-specific response based on a challenge;
storing, in a storage, the challenge and a data element, the data element being an encryption of the key with the response of the PUF as an encryption key; and
enabling, by a chip enabler with one or more registers, the logic circuitry for the designated usage by transferring the key into the register(s), the key being a decryption of the data element with the response as the encryption key,
wherein the logic circuitry comprises regular gates and a plurality of logic key gates defining the logic encryption, wherein the logic encryption is defined in that the designated usage is enabled only if bits of the key in the register(s) are correctly received by the logic key gates, which are connected to the register(s).

11. The method of claim 10, further comprising one or more of the following steps:
generating the response of the PUF based on the challenge;
encrypting the key with the response of the PUF as the encryption key and providing a result as the data element;
decrypting the data element be using the response of the PUF as decryption key.

* * * * *